United States Patent
Harang

(10) Patent No.: US 12,292,971 B2
(45) Date of Patent: May 6, 2025

(54) CYBERSECURITY SYSTEM EVALUATION AND CONFIGURATION

(71) Applicant: Sophos Limited, Abingdon (GB)

(72) Inventor: Richard Edward Harang, Alexandria, VA (US)

(73) Assignee: Sophos Limited, Abingdon (GB)

( * ) Notice: Subject to any disclaimer, the term of this patent is extended or adjusted under 35 U.S.C. 154(b) by 528 days.

(21) Appl. No.: 17/524,930

(22) Filed: Nov. 12, 2021

(65) Prior Publication Data
US 2022/0156372 A1    May 19, 2022

Related U.S. Application Data

(60) Provisional application No. 63/113,462, filed on Nov. 13, 2020.

(51) Int. Cl.
*G06F 21/56* (2013.01)
*G06N 20/00* (2019.01)
*H04L 9/40* (2022.01)

(52) U.S. Cl.
CPC .......... *G06F 21/56* (2013.01); *G06N 20/00* (2019.01); *H04L 63/20* (2013.01); *G06F 2221/034* (2013.01)

(58) Field of Classification Search
CPC ... G06F 21/56; G06F 2221/034; G06N 20/00; G06N 7/01; H04L 63/20; H04L 63/1408; H04L 63/145
See application file for complete search history.

(56) References Cited

U.S. PATENT DOCUMENTS

| | | | |
|---|---|---|---|
| 10,230,749 B1* | 3/2019 | Rostami-Hesarsorkh | G06F 21/56 |
| 10,599,844 B2 | 3/2020 | Schmidtler et al. | |
| 11,409,869 B2 | 8/2022 | Schmidtler et al. | |
| 2019/0018960 A1* | 1/2019 | Chistyakov | G06F 21/57 |
| 2021/0240825 A1* | 8/2021 | Kutt | G06F 21/563 |
| 2023/0038579 A1* | 2/2023 | Wang | G06F 18/2415 |

OTHER PUBLICATIONS

"Confusion matrix", [retrieved on Jan. 31, 2024], from the Internet <URL: https://en.wikipedia.org/w/index.php?title=Confusion_matrix &oldid=980584181> (Year: 2020).*

(Continued)

*Primary Examiner* — Sangseok Park
(74) *Attorney, Agent, or Firm* — Strategic Patents, P.C.

(57) ABSTRACT

Statistical properties of known malware distributions may be used to improve estimates of malware detection metrics such as a base rate of malicious events in a target environment or missed detections (also referred to as false negatives). In particular, numerous synthetic sample distributions may be generated based on the statistical properties of a base data set and/or additional observed data, and used to identify malware distributions that produce overall detection statistics corresponding to model output for live target data. The malware detection metrics for the live target data can then be characterized using the observed distributions of malware (and malware detections) for the synthetic sample distributions.

20 Claims, 9 Drawing Sheets

(56) References Cited

OTHER PUBLICATIONS

Zhang, He, et al. "Deep adversarial learning in intrusion detection: A data augmentation enhanced framework." arXiv preprint arXiv: 1901.07949 (2019). (Year: 2019).*

Harang, R et al., "Burstiness of Intrusion Detection Process: Empirical Evidence and a Modeling Approach", https://arxiv.org/ftp/arxiv/papers/1707/1707.03927.pdf , 12 Pages.

* cited by examiner

CYBERSECURITY SYSTEM EVALUATION AND CONFIGURATION

CROSS-REFERENCE TO RELATED APPLICATIONS

This application claims the benefit of U.S. Prov. App. No. 63/113,462 filed on Nov. 13, 2020, the entire content of which is hereby incorporated by reference.

FIELD

The present disclosure relates to improving cybersecurity in an enterprise network.

BACKGROUND

In the field of cybersecurity, some security vendors focus on correct detections and false alarms as statistics for evaluating how well their solutions perform. They provide data on problematic events (e.g., occurrence of malware, malicious artifacts, or malicious activity) that are correctly detected by the cybersecurity system and on benign events that are incorrectly characterized as problematic. However, these metrics may not provide a complete picture. Missed detections—malicious files or events that a system did not detect—may be equally important to evaluating the performance of a cybersecurity system but missed detections typically are difficult and expensive to quantify. Similarly, the reporting true positive detection rates (accurate detection of malware) and false positive detection rates (erroneous detection of benignware), no matter how accurate, do not permit a direct calculation or estimation of how many detections in a particular report are true or false. As a result, positive detections and false alarm counts are typically reported without also considering missed detections or the accuracy of a total detection count, which can provide a skewed view of the performance of a cybersecurity system. The precision of many cybersecurity systems therefore may be lower than one might naively expect.

There remains a need for improved techniques to evaluate cybersecurity systems, for example by providing more direct measures of the likelihood that a particular malware detection (or safe detection) is accurate.

SUMMARY

Statistical properties of known malware distributions may be used to improve estimates of malware detection metrics such as a base rate of malicious events in a target environment or missed detections (also referred to as false negatives). In particular, numerous synthetic sample distributions may be generated based on the statistical properties of a base data set and/or additional observed data, and used to identify malware distributions that produce overall detection statistics corresponding to model output for live target data. The malware detection metrics for the live target data can then be characterized using the observed distributions of malware (and malware detections) for the synthetic sample distributions.

In one aspect, a computer program product disclosed herein may include computer executable code embodied in a non-transitory computer readable medium that, when executing on one or more computing devices, performs the steps of: evaluating a true positive rate and a false positive rate for a malware detection system, the true positive rate corresponding to an accurate detection of malware by the malware detection system in a base data set and the false positive rate corresponding to an erroneous detection of malware in the base data set by the malware detection system, the base data set labeled with a known composition of malicious code instances and the base data set having a base rate of malware instances; applying the malware detection system to a new data set to determine a first number of detections within the new data set; generating a number of synthetic data sets based on a distribution of malware instances within the base data set; selecting a representative group from the number of synthetic data sets that produce a corresponding set of numbers of detection similar to the first number of detections within the new data set; and determining a malware detection metric for the new data set based on a statistical composition of the representative group.

Implementations may include one or more of the following features. The corresponding set of numbers of detection may be each within a predetermined threshold of the first number of detections. The predetermined threshold may be an absolute numerical threshold. The predetermined threshold may be a relative threshold scaled according to a ratio of a size of the new data set to the size of each of the synthetic data sets. The new data set may include live samples analyzed for an enterprise by the malware detection system. Evaluating the true positive rate and the false positive rate for the malware detection system may include measuring the true positive rate and the false positive rate for the malware detection system when applied to a base data set having a known composition of malware instances and benign instances. The malware detection system may be a machine learning model trained to detect malware based on a training data set, further where each software instance in the training data set is labeled to indicate a malware status. The computer executable code may further perform the step of updating the true positive rate and the false positive rate based on additional software instances received by the malware detection system and automatically labeled by the malware detection system as safe or malicious.

In one aspect, a method disclosed herein may include: evaluating a true detection rate and a false detection rate for a malware detection system when applied to a base data set having a known composition of malicious code instances; applying the malware detection system to a new data set to determine a first detection rate for the new data set; generating a number of synthetic data sets based on one or more properties of the base data set; selecting a representative group from the number of synthetic data sets that produce a corresponding detection rate similar to the first detection rate within the new data set; and determining a malware detection metric for the new data set based on a statistical composition of the representative group selected from the number of synthetic data sets.

Implementations may include one or more of the following features. The method may further include adjusting a security parameter used by a threat management facility to manage security of an enterprise network based on the malware detection metric. The malware detection metric may include an estimated base rate of malware instances for the new data set. The malware detection metric may include at least one of a probability distribution for an estimated base rate of malware instances for the new data set and a confidence interval for the estimated base rate of malware instances. The malware detection metric may include at least one of an estimated true positive rate for the new data set and an estimated false positive for the new data set. The malware detection metric may include an estimated number of missed detections for the new data set. The malware detection metric may include a ratio of true positives to false positives for the new data set.

In one aspect, a system disclosed herein may include: a memory storing a detection model having a true detection rate and a false detection rate for identifying malware when applied to a base data set having a known malware composition; a malware detection system configured to apply the detection model to a new data set to determine a rate of malware occurring within the new data set; an estimation engine configured to synthesize a number of data sets based on properties of the base data set, and to select a representative group from the number of data sets that produce a similar rate of malware to the new data set when analyzed with the malware detection system; and a scoring engine to calculate one or more malware metrics for the new data set based on the representative group.

Implementations may include one or more of the following features. The estimation engine may synthesize the number of data sets using a Metropolis-Hastings algorithm to randomly draw candidates from a proposal distribution and conditionally include each randomly drawn candidate using a probability function. The estimation engine may synthesize the number of data sets using a sequential Monte Carlo simulation to randomly draw samples from the base data set and beta-weighting a result with an increasing beta until an explained sum of squares is within a predetermined threshold of a target. The detection model may include a machine learning model trained to detect malware using malware labels for a training data set. The system may further include a threat management facility configured to adjust a tuning parameter to control a sensitivity for detection of or response to threats based on the one or more malware metrics.

In one aspect, a method for evaluating a cybersecurity system in a target environment disclosed herein may include: receiving estimates of a true positive rate and a false positive rate for the cybersecurity system; refining the estimated true positive rate and the estimated false positive rate and statistically estimating a base event rate for the cybersecurity system in the target environment; determining an estimated distribution of false negatives based on the refined true positive rate, the refined false positive rate, and the estimated base event rate for the cybersecurity system in the target environment; and scoring the cybersecurity system in the target environment based on the distribution of false negatives to generate a score for the cybersecurity system in the target environment.

Implementations may include one or more of the following features. The method may further include generating estimates of the true positive rate and the false positive rate for the cybersecurity system. The estimates of the true positive rate and the false positive rate for the cybersecurity system may be determined based on labeled data, where the labeled data is selected from one of: the same type of target environment, a similar target environment, or a different target environment. The estimates of the true positive rate and the false positive rate may be adjusted based on differences between labeled data environment and the target environment. The cybersecurity system may be configured for the target environment based on the score. The cybersecurity system may be configured for the target environment by configuring operational parameters for the cybersecurity system. The cybersecurity system may be configured for the target environment by enabling or disabling cybersecurity system components. The method may further include predicting an effect of adding additional components, and determining an optimal configuration for the cybersecurity system. The method may further include performing the method for each of a plurality of cybersecurity system configurations. The method may further include comparing the score of each of the plurality of cybersecurity system configurations. The score for the cybersecurity system in the target environment may be displayed to a user. A system for determining a score for a cybersecurity system may perform any of the aforementioned steps of the method.

In one aspect, a cybersecurity system scoring system disclosed herein may include: a receiver for receiving estimates of a true positive rate and a false positive rate for a cybersecurity system under evaluation; an estimator for iteratively refining the estimated true positive rate and the estimated false positive rate and estimating a base event rate for the cybersecurity system under evaluation in a target environment; a determiner for determining an estimated distribution of false negatives based on the refined true positive rate, the refined false positive rate, and an estimated base event rate; and a scorer for scoring the cybersecurity system in the target environment based on the distribution of false negatives.

Implementations may include one or more of the following features. The estimates of the true positive rate and the false positive rate for the cybersecurity system may be determined based on labeled data. The system may further include a configuration system for configuring the cybersecurity system for the target environment based on the score. The configuration system may configure the cybersecurity system for the target environment by configuring operational parameters for the cybersecurity system. The configuration system may configure the cybersecurity system for the target environment by enabling or disabling cybersecurity system components. The scorer may provide a score for each of a plurality of cybersecurity system configurations. The scorer may cause the score of each of the plurality of cybersecurity system configurations to be displayed to an administrator.

In one aspect, a method for evaluating a plurality of cybersecurity systems in a target environment disclosed herein may include receiving estimates of a true positive rate and a false positive rate for each of a plurality of cybersecurity systems under evaluation. And, for each cybersecurity system under evaluation, the method may include: (i) refining the estimated true positive rate and the estimated false positive rate and estimating a base event rate for the cybersecurity system under evaluation in the target environment; (ii) determining an estimated distribution of false negatives based on the refined true positive rate, the refined false positive rate, and the estimated base event rate for the target environment; (iii) scoring the cybersecurity system in the target environment based on the distribution of false negatives to generate a score for the cybersecurity system in the target environment; and (iv) causing a display of the scores for each of the cybersecurity systems under evaluation to a user.

Implementations may include one or more of the following features. The estimated base event rate for the target environment may be iteratively determined using information from the evaluations of each of the plurality of cybersecurity systems. The received estimate of a true positive rate and a false positive rate for one of the plurality of cybersecurity systems may be based on a refined true positive rate and a refined false positive rate for another of the plurality of cybersecurity systems.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
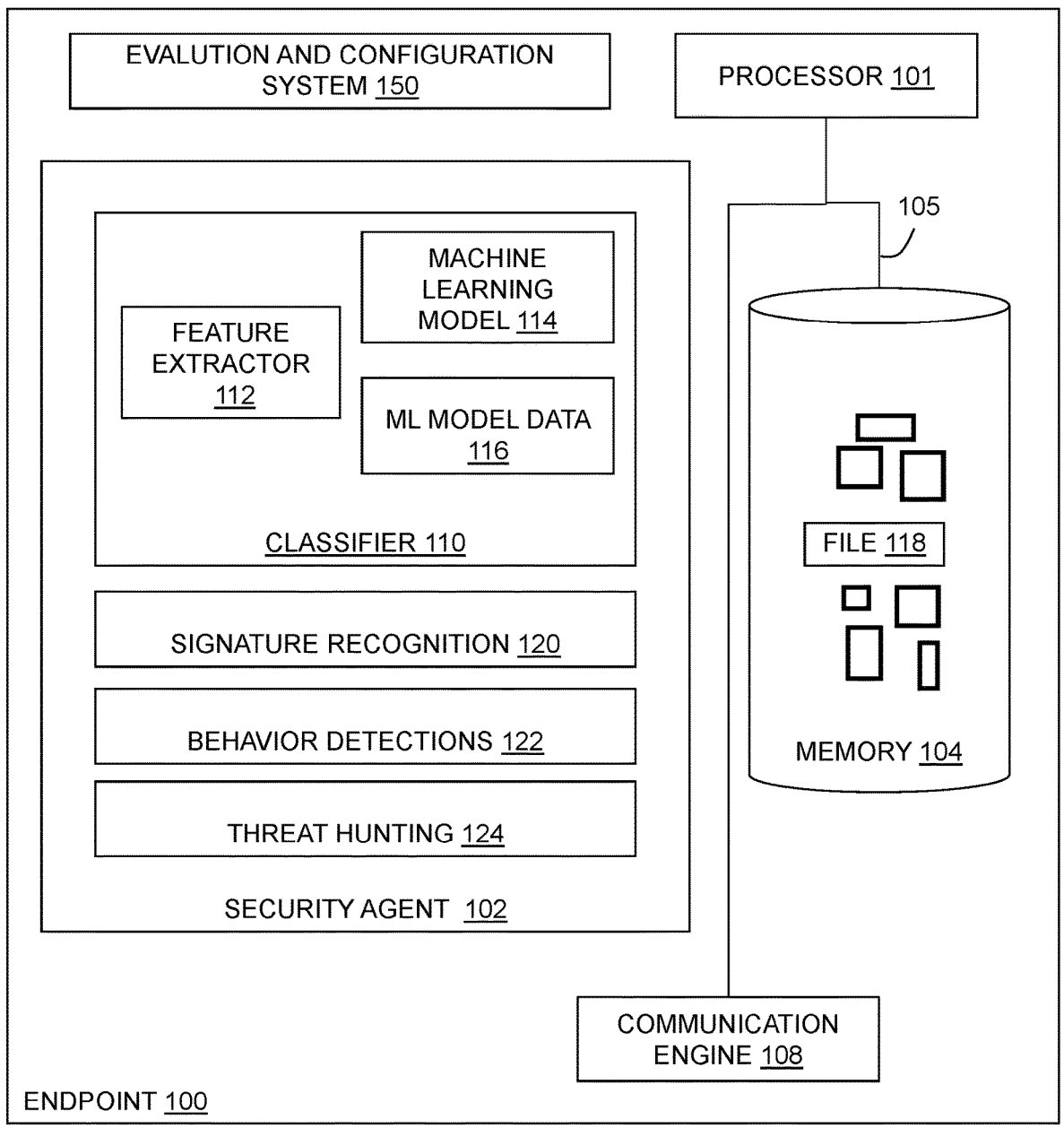
FIG. 1 illustrates a block diagram of an endpoint according to embodiments.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

In general, in various aspects, statistical measurements of target environment data may be used to produce statistical estimates of a base rate of malicious events in a target environment, which in turn may be used to statistically estimate missed detections. An estimate of missed detections may be used to evaluate the performance of the cybersecurity system in the target environment. The techniques described may be used to evaluate and configure machine learning-powered malware detection models as well as other cybersecurity tools. For example, in general, a system that produces a binary good/bad decision may be analyzed for an understanding of both what the system is catching as well as what it is missing. In addition to providing an assessment of real-world performance of cybersecurity systems in target environments, configuration options may be explored to determine whether changes to the system or implementation in a target environment produce benefits to the protection in the target environment. For example, configurations and/or system components may be selected or adjusted to improve performance of a given cybersecurity system in a given target environment.

Security recognition tasks may include but are not limited to the recognition of maliciousness, a security threat, suspiciousness, or any other relevant analysis result. The object of recognition tasks may be, for example, text files, text messages, email messages, social network posts, web site posts, documents, text streams, message streams, or any other suitable analysis object. Recognition tasks may be undertaken, for example, through analysis of features extracted from data. In addition to features of an object of analysis, such as binary or text features, context information also may be used in a security recognition task. In various implementations, contextual information may include message information, such as message header information. Context information may include sender or receiver addresses, sender or receiver domains, reputations associated with a sender or receiver, profile information associated with a sender or receiver, digital signature information, time zone information, timestamp information, transmission path information, attachment file size, attachment information, domain reputation information, universal resource locators (URLs), fonts or other message content context information, or any other suitable contextual information. For example, contextual information may be used in combination with file content information to improve the performance of a recognition task.

FIG. 1 illustrates a block diagram of an endpoint 100 that includes one or more cybersecurity systems to which scoring systems may be applied. The endpoint 100 may be a hardware-based computing device and/or a multimedia device, such as, for example, a compute device, a server, a desktop compute device, a smartphone, a tablet, a laptop and/or the like. The endpoint 100 may be a compute instance. The endpoint 100 includes a processor 101, a memory 104 and a communication engine 108.

The processor 101 may be, for example, a hardware based integrated circuit (IC) or any other suitable processing device configured to run and/or execute a set of instructions or code. For example, the processor 101 may be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 101 is operatively coupled to the memory 104 through a system bus 105 (for example one or more of an address bus, data bus, control bus, serial bus).

The processor 101 may access instructions to implement a security agent 102. The security agent 102 may include a classifier 110, which may be implemented using machine learning. The classifier 110 may include a feature extractor 112, a machine learning model 114, and machine learning model data 116. Each of the feature extractor 112 and the machine learning model 114 may be software stored in memory 104 and executed by processor 101 (e.g., code to cause the processor 101 to execute the feature extractor 112 and the machine learning model 114 may be stored in the memory 104) and/or a hardware-based device such as, for example, an ASIC, an FPGA, a CPLD, a PLA, a PLC and/or the like.

The feature extractor 112 may be configured to receive an analysis object (e.g., one or more of a file, a text stream, a message, a network stream, behavior information, etc.) as an input and output one or more feature vectors associated with the analysis object. In other words, the feature extractor 112 may extract features from the analysis object and form a feature vector including indications of these features.

For example, in some exemplary implementations in which the analysis object is an executable file or script, the feature extractor 112 may identify static features in a file (for example, headers, variable definitions, routines, sub-routines, strings, elements, subtrees, tags and/or the like). A representation of these features may be used to define a feature vector. For example, in some implementations, the feature extractor 112 may normalize each feature and/or input each feature to a hash function to produce a hash value. The feature extractor 112, using the hash values, may form a feature vector (e.g., of pre-determined length and/or of variable length). For example, the hash value of each feature may identify a position and/or bucket in the feature vector and a value at that position and/or bucket in the feature vector may be incremented each time a hash value for a feature identifies that position and/or bucket. As another example, in other implementations, a value associated with that feature may be included in the feature vector at that position and/or bucket. In some instances, the positions and/or buckets to which each feature can potentially hash may be determined based on the length and/or size of that feature. For example, strings having a length within a first range can potentially hash to a first set of positions and/or buckets while strings having a length within a second range can potentially hash to a second set of positions and/or buckets. The resulting feature vector may be indicative of the features of the structured file.

For example, the feature extractor 112 may receive a PE file or other zipped file, wrapped file, or the like containing executables, data, libraries, and other content and the like, and identify features within that file (e.g., strings, elements, subtrees, tags, function calls, etc.). The feature extractor 112 may then provide each feature as an input to a hash function to generate a hash value for that feature. The feature extractor 112 may use the hash values to form a feature vector representative of and/or indicative of the features in the file. Similar to a PE file, the feature extractor 112 may receive a HTML file, an XML file, or a document file, and identify features (e.g., strings, elements, subtrees, tags, function calls, etc.) within that file. The feature vector may be provided as an input to the machine learning model 114.

For example, in some exemplary implementations in which the analysis object is a file, text stream, or message the feature extractor 112 may characterize bits in a binary file and/or characters in a text file (for example, message headers, strings, sub-strings, elements, tags and/or the like). A representation of features may be used to define a feature vector. For example, in some implementations, the feature extractor 112 may identify features of text by extracting words using a predefined vocabulary and generating unigram and bigram tokens from the selected words. Positional weights may be assigned to tokens to encode positional information, and one or more transformations may be applied to the weights to add non-linearity, e.g., $\log(w)$, $\exp(w)$, or $w^2$.

The analysis object may be, for example, files (e.g., Portable Executable (PE) files), documents, processes, network flows, or any other suitable computing object or the like suitable for analysis. Recognition tasks may be applied, for example, to features determined by static analysis, dynamic analysis, behavior analysis, activity analysis, or any other suitable features. In addition to features of an object of analysis, context information also may be included in training data. In various implementations, contextual information may include an attribute indicator that indicates a family or type of malware or malicious object.

In some implementations, hash functions may be used as transformation functions and/or to identify a position and/or bucket in the feature vector and a value at that position and/or bucket in the feature vector may be incremented each time a hash value for a feature identifies that position and/or bucket. As another example, in other implementations, a value associated with that feature may be included in the feature vector at that position and/or bucket. In some instances, the positions and/or buckets to which each feature can potentially hash may be determined based on the length and/or size of that feature. For example, strings having a length within a first range can potentially hash to a first set of positions and/or buckets while strings having a length within a second range can potentially hash to a second set of positions and/or buckets. The resulting feature vector may be indicative of the features of the structured file.

For example, the feature extractor 112 may receive a message and identify text features within that message (e.g., strings, substrings, tokens, etc.). The feature extractor 112 may then provide each feature as an input to a transformation function to generate a value for that feature. The feature extractor 112 may use the values to form a feature vector representative of and/or indicative of the text features of the message. Likewise, the feature extractor 112 may receive an HTML file, an XML file, or a document file, and identify features within that file. The feature vector may be provided as an input to the machine learning model 114.

Likewise, the feature extractor 112 may receive contextual information for an analysis object, such as information associated with a message or file. This may include, as examples not intended to be limiting, one or more of an indication of an origin of a file, a reputation of an address or a domain name associated with a file, transmission information, date and time stamps, time zones, servers associated with transmission. The feature extractor may perform specified operations on contextual information, to normalize or reduce it, or to emphasize certain features of the contextual information. For example, a feature extractor may use hash functions or transformation functions on the contextual information. In some implementations, the resulting contextual information may be provided as an input to the machine learning model 114.

The machine learning model 114 may be any suitable type of machine learning model such as, for example, a neural network, a decision tree model, a gradient boosted tree model, a random forest model, a deep neural network, or other suitable model. The machine learning model 114 may be configured to receive a feature vector associated with an analysis object, and context information associated with the analysis object, and output an analysis result, such as a score indicating whether the analysis object is, for example, potentially malicious. The machine learning model may provide an output indicating a threat classification. The threat classification may indicate an evaluation of the likelihood that the analysis object is a threat. For example, the threat classification may classify an analysis object into different categories such as, for example, benign, potentially malicious, malicious, type of malicious content/activity, class of malicious content/activity, attack family, or another suitable threat classification. The threat classification may provide an output within a range (for example between 0 and 10, between 0 and 1, between 0 and 4) that indicates a probability of maliciousness.

The memory 104 of the endpoint 100 may be, for example, a random access memory (RAM), a memory buffer, a hard drive, a read-only memory (ROM), an erasable programmable read-only memory (EPROM), and/or a combination of these or other types of memory. The memory 104 can store, for example, one or more software modules and/or code that can include instructions to cause the processor 101 to perform one or more processes, functions, and/or the like (e.g., the feature extractor 112 and the machine learning model 114). In some implementations, the memory 104 may be a portable memory (for example, a flash drive, a portable hard disk, and/or the like) that may be operatively in communication with the processor 101. In other instances, the memory 104 may be remotely operatively coupled with the endpoint 100. For example, a remote database server may be operatively coupled to the malicious content detection device.

The memory 104 may store machine learning model data 116 and an analysis object, shown here as an example as file 118. The machine learning model data 116 may include data generated by the machine learning model 114 during processing of the file 116. The machine learning model data 116 can also include data used by the machine learning model 114 to process and/or analyze an analysis object (for examples, weights associated with the machine learning model, decision points associated with the machine learning model, and/or other information related to the machine learning model).

The analysis object, shown here for example as a file 118, may be, for example a binary file or a text file. The file 118 may be or may include an executable file, an email message, a representation of a text stream, a document, a text message, a social media post, a web site post and/or another suitable analysis object. For example, in various implementations, the file may be at least one of an executable (EXE) file, a Hypertext Markup Language (HTML) file(s), a JavaScript file(s), an Extensible Markup Language (XML) file, a Hypertext Preprocessor (PHP) file(s), Microsoft® office documents (for example, Word®, Excel®, PowerPoint®, and/or the like), a uniform resource locator (URL), Android Package Kit (APK) files, Portable Document Format (PDF) files, any other files having defined structure, and/or the like. The file 118 can include or can reference software code, a webpage(s), a data file(s), a model file(s), a source file(s), a script(s), a process(es), a binary executable file(s), data and/or a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the file 118 may be analyzed by the processor 101 of the endpoint 100 to identify whether the file is malicious, as described in further detail herein.

In some implementations, the analysis object may be, for example, a network stream or a text stream. A representation of the network stream or text stream may be stored in the memory 104. A representation of the network stream or text stream may be included in the file 118. The file 118 may include the output of one or more network sensors recording network traffic. For example, a network stream may be extracted from packets of network traffic. The file 118 may include data extracted from a data lake of sensor data.

The security agent 102 may also include a signature recognition engine 120, which may be used to perform static analysis on analysis objects. For example, the signature recognition engine may be an anti-malware engine, and include traditional anti-virus capability. The signature recognition engine may use rules and signature data to analyze features of analysis objects, again as an exemplary object, file 118. The signature recognition engine may use rules and signature data to recognize malicious objects. The signature recognition engine 120 may operate in coordination with the classifier 110 and other elements of the security agent 102 to evaluate analysis objects for maliciousness.

The security agent 102 may also include a behavior detection engine 122. The behavior detection engine 122 may monitor behavior of processes running on the endpoint 100 to recognize malicious activity. For example, the behavior detection engine 122 may recognize attempts to access application programming interfaces (APIs) associated with an operating system running on the endpoint 100, or attempts by a process to communicate using the communication engine 108. The behavior detection engine 122 may operate in coordination with the signature recognition engine 120 and/or the classifier 110 and other elements of the security agent 102 to evaluate analysis objects for maliciousness.

The security agent 102 may also include a threat hunting engine 124. The threat hunting engine 124 may be used by security analysts to access and analyze activity on the endpoint 100. The threat hunting engine 124 may generate event notifications and alerts for a threat hunting application on the endpoint or in a threat management facility. The threat hunting engine 124 may provide a capability for analysts to investigate notifications and alerts generated by the threat hunting engine 124, the signature recognition engine 120, the classifier 110 and/or other elements of the security agent 102. The threat hunting engine 124 may operate in coordination with the signature recognition engine 120 and/or the classifier 110 and other elements of the security agent 102 to investigate analysis objects.

The communication engine 130 may be a hardware device operatively coupled to the processor 101 and memory 104 and/or software stored in the memory 104 executed by the processor 101. The communication engine 108 may include, for example, a network interface card (NIC), a Wi-Fi™ module, a Bluetooth® module and/or any other suitable wired and/or wireless communication device. Furthermore, the communication engine can include a switch, a router, a hub and/or any other network device. The communication engine 108 may be configured to connect the endpoint 100 to a communication network (not shown in FIG. 1). In some instances, the communication engine 108 may be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication engine 108 can facilitate receiving and/or transmitting a structured file through a communication network. In some instances, a received file may be processed by the processor 101 and/or stored in the memory 104.

In use, the security agent 102 may be configured to receive an analysis object such as file 118, from a communication network (not shown in FIG. 1) via the communication engine 108 and/or via any other suitable method (e.g., via a removable memory device). The feature extractor 112 may be configured to access the file 118 and extract a set of features from the file 118 to define a feature vector. This feature vector and/or the set of features may be stored in the memory 104. The feature extractor 112 also may determine contextual information for the file. The contextual information may include, for example, information about the file 118 or information in the file 118 in addition to the relevant content. The contextual information may include, for example, information about the file that is stored, for example, in a database (not shown) or in another file in the memory 104, or that is derived from such information. The machine learning model 114 may retrieve the stored set of features and the contextual information from the memory 104 and analyze the feature vector and the contextual information. Based on the analysis, the machine learning model 114 may indicate whether the file 114 is malicious by outputting a maliciousness classification. The endpoint 100 may store the maliciousness classification of the file 118 in the memory 104.

An evaluation and configuration system 150 may be used to evaluate and configure a cybersecurity system. Although shown on the endpoint 100, the evaluation and configuration system 150 may be implemented in any suitable manner, for example, as part of a management interface, as part of an API used to access another system, in a web browser accessing an evaluation and configuration interface on another device, in a cloud service, in client and/or server components (for distributed deployments) or in other implementations. The evaluation and configuration system 150 may be used to evaluate a cybersecurity system (such as components of the security agent 102 and/or a number of security agents on a number of endpoints) in a target environment such as an enterprise network or networks. For example, the evaluation and configuration system 150 may be used to score a cybersecurity system as described herein. The evaluation and configuration system 150 may be used to score various configurations of cybersecurity systems (e.g., with varying operational parameters, components, and systems) and to automatically optimize configurations or to provide suggestions for configurations to an administrator based on the scoring. The evaluation and configuration system 150 may model changes to configurations of cybersecurity systems (e.g., with varying operational parameters, components, and systems) to predict impact of configurations on the performance of cybersecurity systems. The evaluation and configuration system 150 may provide a capability for a user to allow for automatic configuration of a cybersecurity system based on the scoring. The evaluation and configuration system 150 may provide a capability for a user to configure a cybersecurity system based on the scoring and/or predicted changes based on configurations.

Figure 2:
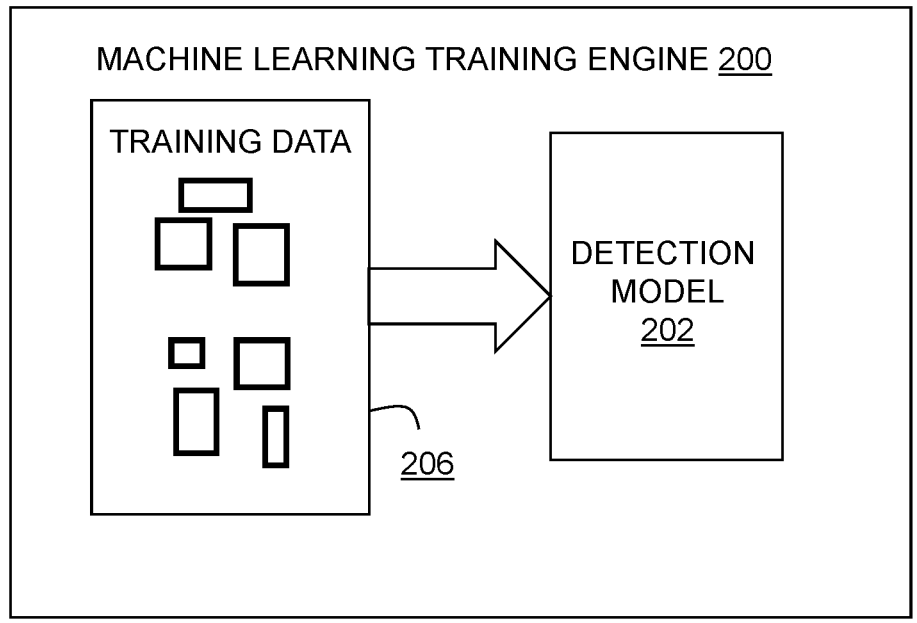
FIG. 2 illustrates a machine learning training engine according to embodiments.

Referring to FIG. 2, an exemplary machine learning training engine 200 includes a detection model 202 and training data 206. Training data 206 may include data used to train a detection model 202 to perform cybersecurity recognition tasks. In some instances, training data 206 can include multiple sets of data. In some implementations, each set of data in the training data 206 may contain at least one set of input information and an associated desired output value or label. The training data 206 typically includes a large amount of data and/or number of sets of data. The training data 206 may include analysis objects and context information for the analysis objects. In some implementations, the training data may include input files pre-categorized into categories such as, for example, malicious files and benign files. In some implementations, the training data may include files with associated threat scores. In some implementations, the training data may include contextual data, such as address information and/or reputation information. In some implementations, the training data 206 may include feature vectors for some files and context information for the files. In some implementations, the training set 206 may include files, context information for the files, and threat scores for files. In some implementations, context information for an analysis object includes context information from multiple, different observations of that analysis object. For example, for a message, context information may include results from different observations of the file.

Just as one example, analysis objects may be PE files, and the training data may include PE file features derived from static analysis of the PE files.

Figure 3:
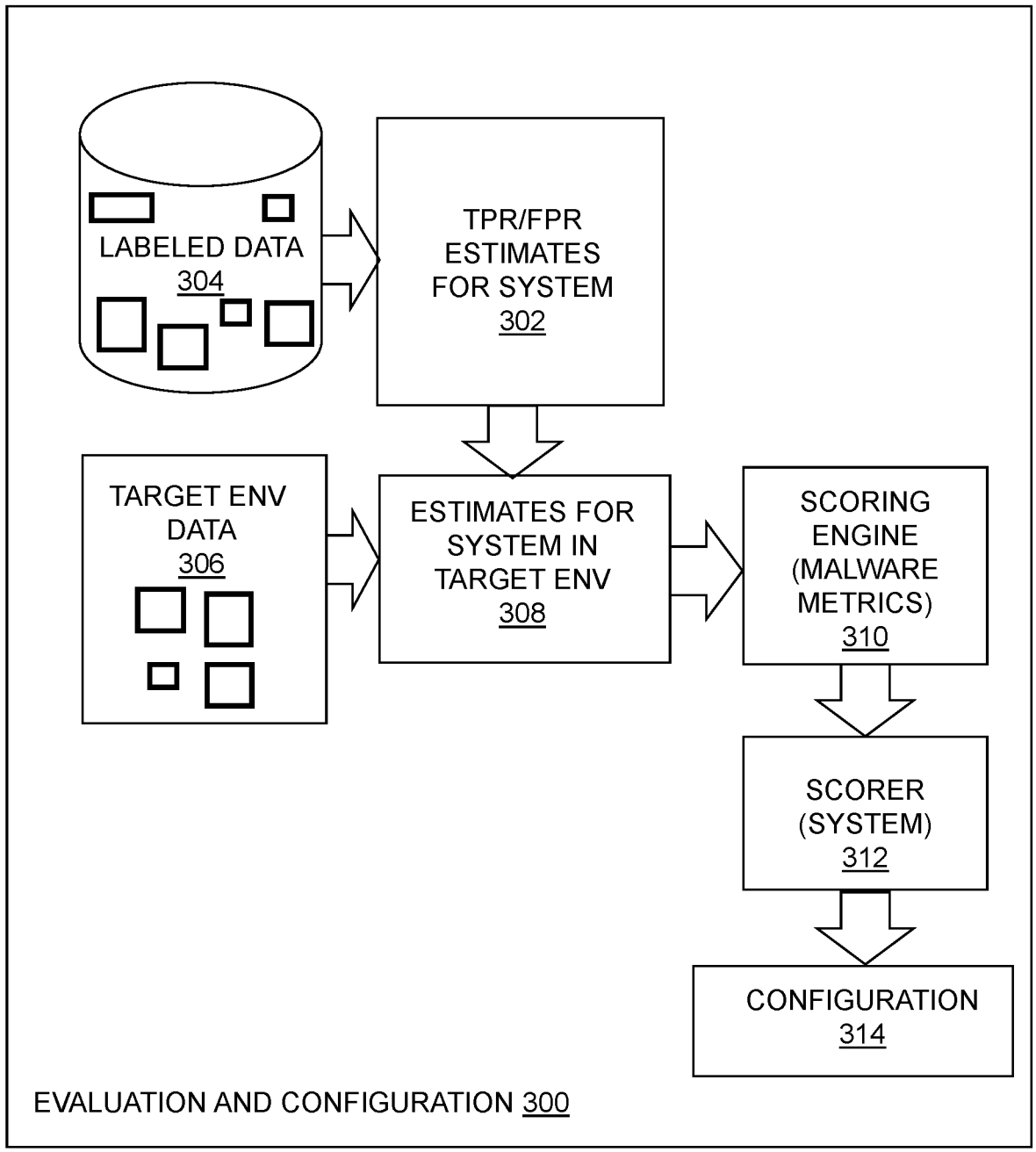
FIG. 3 illustrates an evaluation and configuration system according to embodiments.

Referring to FIG. 3, an evaluation and configuration system 300 may be used to evaluate a given cybersecurity system, such as one or more elements of the security agent 102 of FIG. 1. The evaluation and configuration system evaluates the cybersecurity system in the context of a target environment. A target environment may be, for example, an enterprise network, a subset or elements of an enterprise network, a combination of enterprise networks, or another suitable environment. A target environment will have some number of analysis objects, some of which may be malicious and others of which may be benign. The cybersecurity system may be evaluated for its detection capability for detecting malicious analysis objects. As one example, a target environment may be a network of a company, and a cybersecurity system may be evaluated for its detection capability with respect to portable executable (PE) files.

The evaluation and configuration system 300 may use statistical methods to determine estimates of a true positive rate and a false positive rate for the cybersecurity system 302. In some implementations, this estimate may be determined in the target environment, in an environment similar to the target environment, or in an environment that is different from the target environment but similar enough or may be adjusted appropriately. As shown in the figure, a memory 304 storing labelled data may be used to estimate the true positive rate and the false positive rate for the cybersecurity system. In some implementations, publicly or commercially available databases of analysis objects, such as those provided by VirusTotal, may be used to generate the estimates of true positive rate and false positive rate for the cybersecurity system 302.

The evaluation and configuration system 300 may use statistical methods to determine refined estimates of a true positive rate and a false positive rate, and an estimate of the "base level" of malicious objects in the target environment 308. In some implementations, this may be accomplished by using an initial estimate of a true positive rate and a false positive rate from the same or similar target environments. In some implementations, this may be accomplished by using an initial estimate of a true positive rate and a false positive rate from other target environments and adjusting for differences. In some implementations, this is accomplished by using historical labeled data stored in the memory 304 to estimate a true positive rate and false positive rate for the cybersecurity system with respect to the labeled data, for example, another environment that has labeled data. For example, a database of threat reports may have suitable labeled data.

The memory 304 may also or instead store a detection model such as any of the machine learning models or the like described herein, which may be trained using the historical labeled data, or any other suitable detection model or the like. The detection model may have a characteristic true detection rate and a false detection rate for identifying malware when applied to a base data set having a known malware composition, such as the labeled data stored in the memory 304.

In this example, we assume the existence of a labeling function that relies on data that is not generally available for all files, but does exist for a subset of files (e.g., a database of labeled analysis objects, threat feed reports). Analysis objects that have sufficient data to have the labeling function applied to them we call "labeled data." If we know (or assume) the true positive rate and the false positive rate of the labeling function, at least up to a statistical distribution, we can determine the true positive rate and the false positive rate of the cybersecurity system for the labeled data. We can then assume the true positive rate and false positive rate as a starting point for estimations with respect to the target environment, for example, if it is similar enough to the target environment. The analysis can also be adjusted for differences between the labeled data and the target environment, as appropriate.

In various embodiments, estimating the true positive rate and the false positive rate for the cybersecurity system with respect to the labeled data may be accomplished using a sequential Monte Carlo (SMC), by repeatedly: (i) tempering initial estimates for the true positive rate and the false positive rate, and the base rate of malicious events; (ii) drawing proposals for the true positive rate, the false positive rate, and the base rate; (iii) using these proposals, and assuming conditional independence of the label functions from the cybersecurity system, sampling a split of the data into malicious and benign files according to the base rate, and then further sampling splits of the malicious and benign files into model and system true and false positives and negatives according to the labeled true positive rate and false positive rate and the sampled cybersecurity system true positive rate and false positive rate; (iv) from the splits so obtained, reconstructing the total counts of files according to just the labeled data and the cybersecurity system functions: (label positive+system positive), (label negative+system negative), (label positive+system negative), (label negative+system positive); (v) comparing the total counts so obtained via simulation to the counts observed in reality using a weighted Gaussian pseudo-likelihood function, and using the resulting information to continue tempering the distributions for system true positive rate and false positive rate and the base rate via SMC.

When the tempering process is complete, the tempered distributions approximate our posterior beliefs about the system true positive rate and the false positive rate for the target environment. As mentioned, these may be adjusted based on additional information about the target environment. For example, if this target environment, or other target environments that are similar to the target environment, have had results that are different from the labeled data source in the past, a partial or similar adjustment may be made to the starting values for the true positive rate and the false positive rate for the target environment.

From the initial estimates of the true positive rate and the false positive rate (based on the labeled data and any adjustments), and the estimate of the base level of malicious events in the target environment, an estimate of false negatives may be determined 310. The false negatives are the estimate of the "misses" of the detection capability of the cybersecurity system in the context of the target environment. An estimate of true negatives also may be determined. To do this, we first fine-tune the posterior distributions for the system true positive rate and false positive rate to the target environment data and estimate the base rate for the target environment.

We assume that all data of interest has had the cybersecurity system applied to it, that we do not know the base rate of the target environment, and that we have estimates of system true positive rate and false positive rate as determined by the labeled data and any adjustments. We either assume some prior distribution on the base rate of the environment, or we use a non-informative prior on this parameter (e.g., 50%, or any value between 0% and 100% equally likely). We then perform an inference process (again using SMC): (i) temper the prior distributions for the false positive rate, true positive rate, and base rate; (ii) draw proposals for the true positive rate and the false positive rate for the cybersecurity system, and the base event rate; (iii) using those proposals, sample a split of the data into malicious and benign files according to the base event rate, and then further sample splits of the malicious and benign files into system true and false positives and negatives according to the sampled system true positive rate and false positive rate; (iv) combine true and false positives to obtain the total number of simulated detections; (v) compare the total number of simulated detections so obtained to the number observed in reality using a weighted Gaussian pseudo-likelihood function, and use the resulting information to continue tempering the distributions for the cybersecurity system true positive rate and false positive rate and base rate via SMC. When the tempering process is complete, our SMC-derived distribution for the system true positive rate, false positive rate, and environment base rate will be an approximation of the desired posteriors.

The distribution number of false negatives may then be estimated using those approximate posteriors as follows: (i)

sample a base rate, system true positive rate, and system false positive rate from the data; (ii) simulate, as per the previous step, malicious and benign samples and corresponding system true and false negatives and positives, and re-compute the total positives count; (iii) if the total simulated positives count is within some predetermined margin of error of the observed positives count, then retain the sample and corresponding false negative, otherwise discard the simulation in its entirety; (iv) repeat the previous steps until a sufficiently large number of samples to estimate the distribution of false negatives has been obtained.

The estimated number of false negatives may be used to determine a score for the cybersecurity system 312 in the context of the target environment. Any suitable scoring function may be used. For example, the score may be based on a raw number of false negatives, a predetermined number (e.g., 1 or 10) divided by the estimated number of false negatives, or a number of false negatives divided by a predetermined number of events (e.g., the number of false negatives for every 10,000 events). The score may also be based on the estimated number of true positives and/or false positives. The score may be multi-dimensional, so that it includes the number of true positives, the number of false positives, and the number of false negatives. The score may be a calculation based on the number of true positives, the number of false positives, and the number of false negatives.

The evaluation and configuration system 300 may include a scoring engine 310 configured, e.g., by computer executable code to calculate one or more malware metrics such as malware detection metrics for a data set such as the target environment data 306 based on a representative group of synthesized samples. This may, for example, include a refined estimate of true positives, false positives, true negatives, false negatives, and a general malware rate. Of particular interest in some analyses, the false negative rate may be used to specifically provide a quantitative measure of missed malware detections.

A scorer 312 may be used to determine an overall security score for the target environment (and/or the security system protecting the target environment) and to control a configuration system 314 for the cybersecurity system for the target environment. For example, configuration system 314 for the cybersecurity system may provide configuration parameters that can be adjusted to increase or decrease sensitivity. If the number of false negatives meets a threshold, the sensitivity of the cybersecurity system may be adjusted. This may be balanced against the number of false positives. As a simple example, if there are too many false negatives, the sensitivity may be increased, so that a lower score is needed to convict an event as malicious. Or, as another simple example, if there are a low number of estimated false negatives but there are a relatively larger number of false positives, the sensitivity may be decreased. Also based on the score, and in coordination with or independently of configuration, components of the cybersecurity system may be enabled or disabled. For example, if there are a large number of false negatives, an additional scanning component may be enabled. And, as described further herein, cybersecurity systems may be compared to determine which cybersecurity system, which cybersecurity system components, and/or which cybersecurity system configurations are best suited for a given target environment. More generally, the configuration system 314 may use any suitable security configuration tools and parameters to control detection and remediation of security risks within the target environment.

Figure 4:
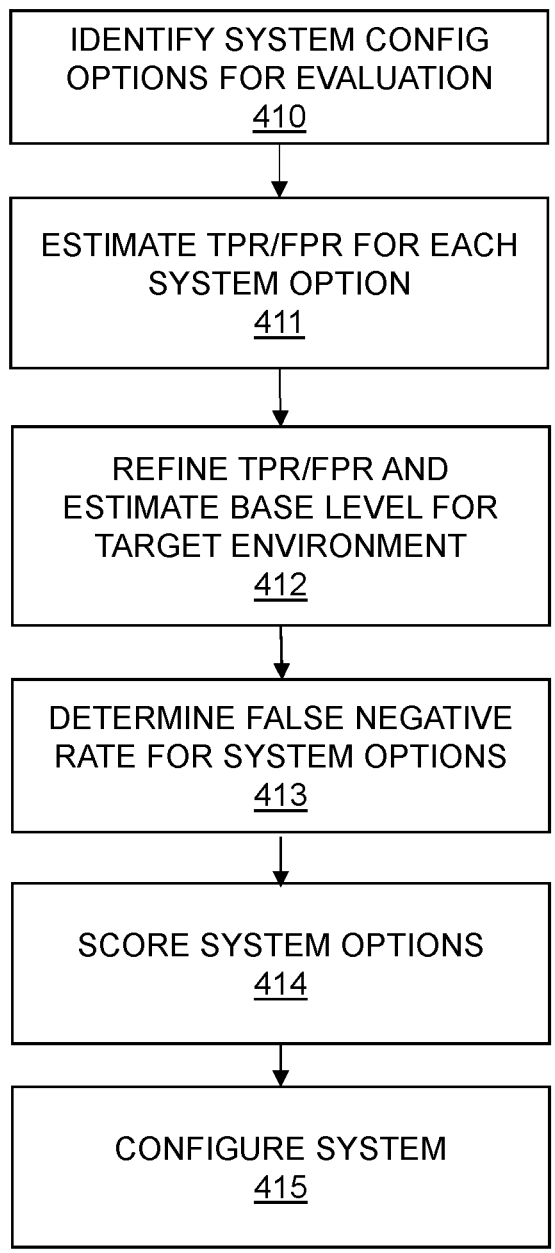
FIG. 4 illustrates a flowchart depicting scoring and configuration according to embodiments.

Referring to FIG. 4, a number of cybersecurity system configuration options may be identified for evaluation, as shown in block 410. The cybersecurity system configuration options may include cybersecurity system configurations (e.g., settings or parameters), cybersecurity components (e.g., enabled or disabled) and/or cybersecurity systems. The cybersecurity configuration options each may be scored as described with reference to FIG. 3, for example, by scoring a first option, then scoring a second option, then scoring a third options, and so on. Any number of options may be scored. The score may be used to determine whether the configurations, components, or systems reduce the number of false negatives without impacting the number of true positives and the number of false positives.

As shown in block 411, for each cybersecurity system configuration option, the estimated true positive rate and the estimated false positive rate for the cybersecurity system with the configurations may be determined. This may be accomplished as described with reference to FIG. 3, by determining an estimated true positive rate and an estimated false positive rate when the cybersecurity system is applied to labelled data.

As shown in block 412, for each cybersecurity system configuration option, the true positive rate and the false positive rate may be refined, and the base level of malicious events estimated for the target environment. This also may be accomplished as described with reference to FIG. 3, by starting with the estimated true positive rate and estimated false positive rate for the labeled data, and adjusting as necessary for the cybersecurity system configuration option.

It should be understood that the estimated base level of malicious events in the target environment should be the same for each of the cybersecurity system configuration options. By measuring multiple options (e.g., configurations, components and/or systems) it may be possible to refine the estimate for the base level of malicious events, and in doing so, improve the accuracy of the estimates for all of the options.

As shown in block 413, for each cybersecurity system configuration option, an estimated false negative rate may be determined. As shown in block 414, the estimated false negative rates may be used, optionally along with the estimated true positive rates and estimated false positive rates, to score each option.

As shown in block 415, the cybersecurity system may be configured based on the scores. The configuration may be based, for example, on the estimated false negative rate meeting a threshold. The configuration may be based on, for example, a cost/benefit optimization to optimize the configurations, components, or cybersecurity system(s). For example, an optimization may minimize cost and maximize performance for each of the configuration options.

Figure 5:
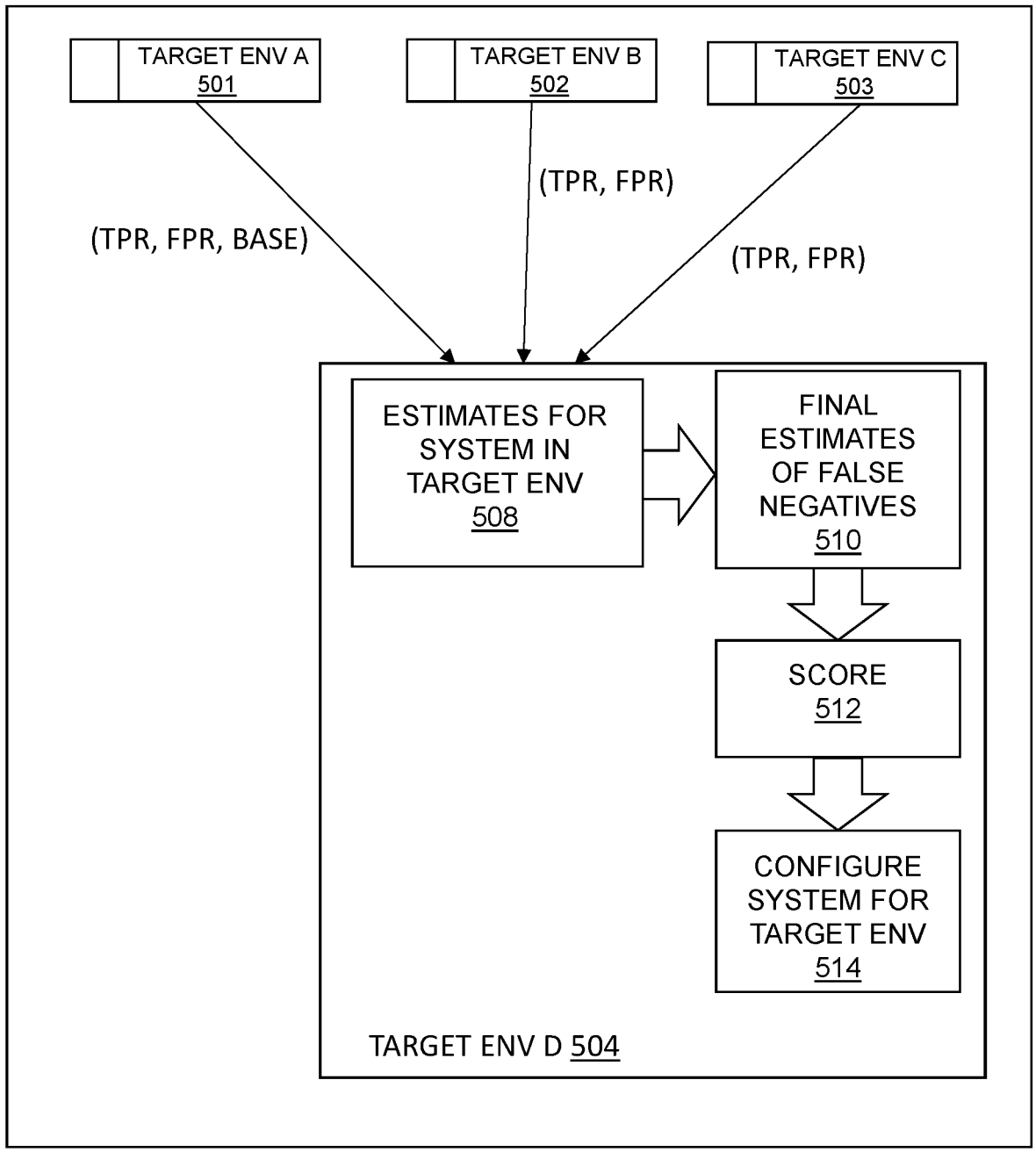
FIG. 5 illustrates a block diagram according to embodiments.

Referring to FIG. 5, estimates of a true positive rate, a false positive rate, a base event rate, and a false negative rate may be determined for a given cybersecurity system for a number of target environments, for example target environment A 501, target environment B 502, and target environment C 503. These historical estimates from the other target environments (501, 502, 503) may be used as the initial values for scoring another target environment, shown as target environment D 504, e.g., as prior distributions to provide a basis for synthesizing representative data sets for the new target environment. In some implementations, the true positive rate and the false positive rate from one or more other target environments may be used. In some implementations, the true positive rate, false positive rate, and base event rate from one or more other target environments (501, 502, 503) may be used as the initial values for the SMC when determining the estimates for the cybersecurity system in target environment D 508. As shown in the figure as an illustrative example, target environment A 501 is providing the true positive rate, false positive rate, and base event rate, while target environment B 502 and target environment C 503 are providing the true positive rate and false positive rate. Selection of rates that are used may be based on the similarity of the cybersecurity systems evaluated, similarity of the target environments, proximity in time, or proximity or similarity of other factors.

In some implementations, the estimates may be weighted when combined, based on the similarity of the other target environments (501, 502, 503) to the target environment D. In some implementations, the estimates may be adjusted for differences in the cybersecurity systems (e.g., configuration, component, or system differences) evaluated in the other target environments (501, 502, 503).

Figure 6:
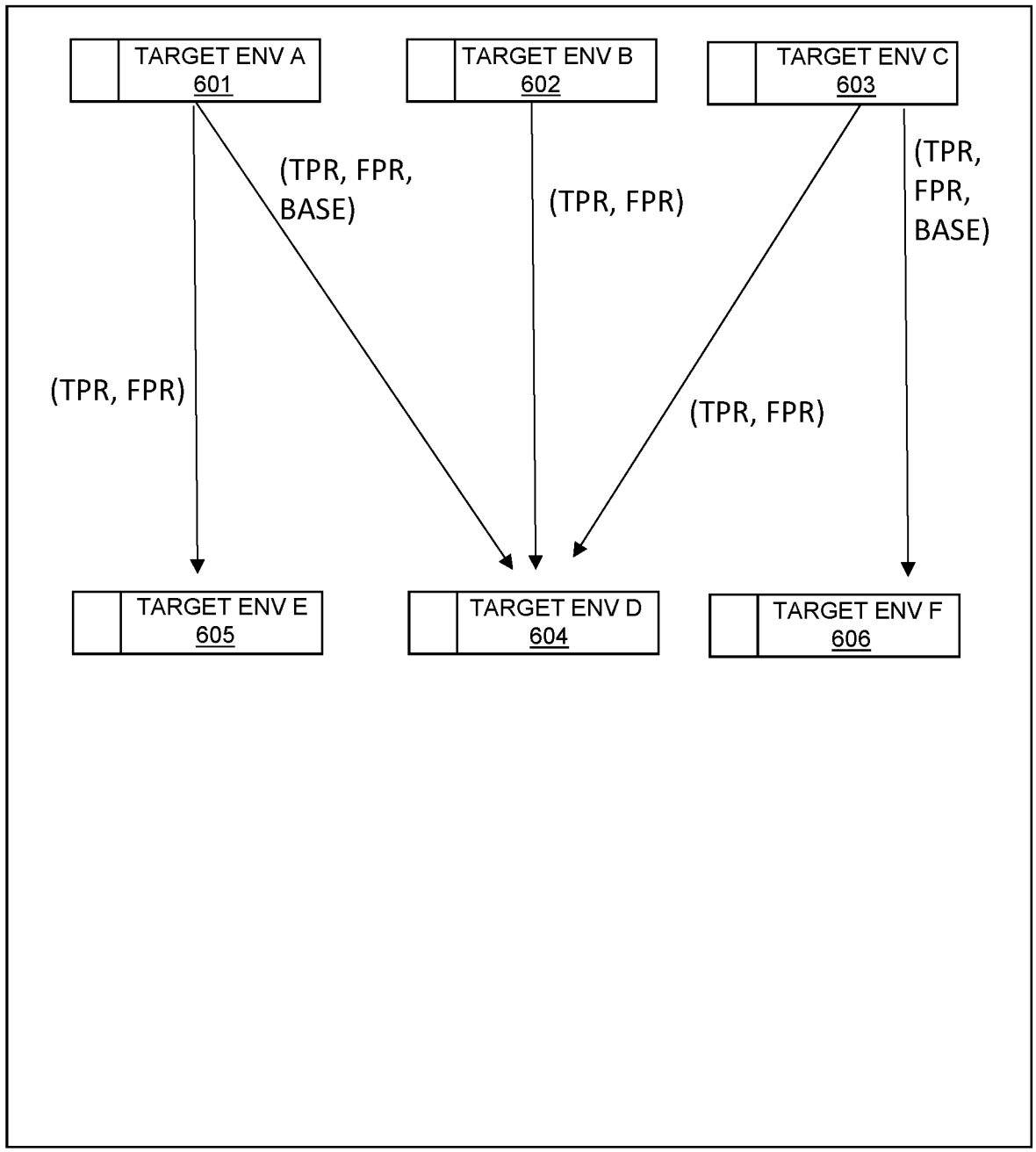
FIG. 6 illustrates a block diagram according to embodiments.

Referring to FIG. 6, in various embodiments, a true positive rate, a false positive rate and/or a base event rate determined for one or more target environments may be used as initial values for one or more other target environments. As shown, rates from target environment A 601 may be used with target environment D 604 as well as target environment E 605. Rates from target environment C 603 may be used with target environment D 604 as well as target environment F 606. Rates from target environment B 602 may be used with target environment D 604. As described, rates from different target environments may be combined, for example, the true positive rates from target environment A 601, target environment B 602 and target environment C 603 may be combined for an initial true positive rate for target environment D 604. The rates from the target environments (601, 602, 603) may be weighted or adjusted based on any suitable factor, including without limitation the similarity of the cybersecurity systems, similarity or differences between target environments, and the date/time of the determination of the rate.

Figure 7:
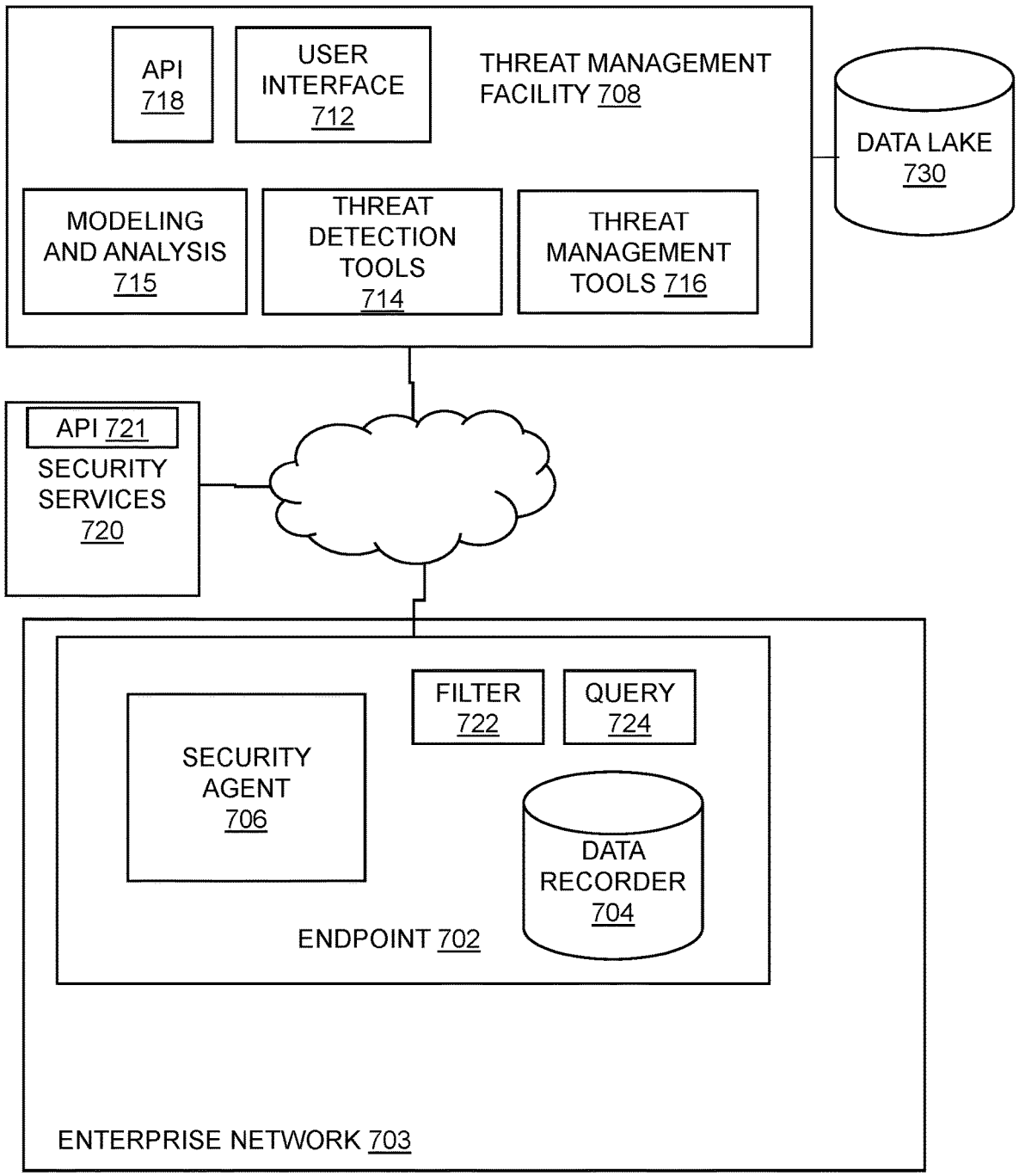
FIG. 7 illustrates a system for enterprise network threat detection according to embodiments.

FIG. 7 shows a system 700 for enterprise network threat detection. The system 700 may use any suitable tools and techniques for threat management, such as those contemplated herein. In the system 700, a number of endpoints such as the endpoint 702 in an enterprise network 703 may log events in a data recorder 704. A local agent on the endpoint 702, depicted here as the security agent 706, may identify events, filter the event data and feed a filtered data stream to a threat management facility 708. The threat management facility 708 may be a centrally administered threat management facility or may be local to an enterprise network or collection of enterprise networks. The threat management facility 708 can locally or globally tune filtering by local agents 706 based on the data stream and/or malware detections, as obtained using the techniques described herein, and can query local event data recorders for additional information where necessary or helpful in threat detection or forensic analysis. The threat management facility 708 may also or instead store and deploy a number of security tools such as a web-based user interface 712 to aid in the identification and assessment of potential threats by a human user. The user interface 712 may be supported by machine learning models. This may, for example, include machine learning analysis of new code samples or models to provide human-readable context for evaluating potential threats. More generally, the threat management facility 708 may provide any of a variety of threat management tools 716 to aid in the detection, evaluation, and remediation of threats or potential threats.

The threat management facility 708 may perform a range of threat management functions. The threat management facility 708 may include a user interface 712 for access to threat management and network administration functions, threat detection tools 714, an application programming interface 718 for security services 720 to integrate with threat management facility 708. The threat management facility may also communicate to other security services 720 using an API, such as exemplary API 721 provided by a security service.

The user interface 712 may include a website or other graphical interface or the like, and may provide an interface for user interaction with the threat management facility 708, e.g., for threat detection, network administration, audit, configuration and so forth. This user interface 712 may facilitate notification and determination of threats and may provide controls for a user to dispose of such threats as desired, e.g., by permitting execution or access, by denying execution or access, or by engaging in remedial measures such as sandboxing, quarantining, vaccinating, and so forth.

The threat detection tools 714 may include any suitable threat detection tools, algorithms, techniques, or any other tools or the like useful for detecting threats or potential threats within an enterprise network. This may, for example, include signature based tools, behavioral tools, machine learning models, and so forth. In general, the threat detection tools 714 may use event data provided by endpoints within the enterprise network, as well as any other available data such as network activity, heartbeats, and so forth to detect malicious software or potentially unsafe conditions for a network or endpoints connected to the network. In one aspect, the threat detection tools 714 may usefully integrate event data from a number of endpoints (including, e.g., network components such as gateways, routers, and firewalls) for improved threat detection in the context of complex or distributed threats. The threat detection tools 714 may also or instead include tools for reporting to a separate modeling and analysis module 715, e.g., to support further investigation of security issues, creation or refinement of threat detection models or algorithms, review and analysis of security breaches and so forth.

The term "malware detection system," as used herein, is intended to refer to any combination of the threat detection tools 714 deployed at the threat management facility, the security agent(s) 102 executing on one or more endpoints 100, and any detection models, data sets, event sources, and the like used together or individually to detect malware within a system such as an enterprise network of managed computing assets.

The threat management tools 716 may be used to manage or remediate threats to the enterprise network that have been identified with the threat detection tools 714 or otherwise. Threat management tools 716 may, for example, include tools for sandboxing, quarantining, removing, or otherwise remediating or managing malicious code or malicious activity, e.g., using any of the techniques described herein.

In general, the application programming interface 718 may support programmatic connections with security services 720, which may be third-party security services. The application programming interface 718 may, for example, connect to Active Directory or other customer information about files, data storage, identities and user profiles, roles, access privileges and so forth. More generally the application programming interface 718 may provide a programmatic interface for customer or other third party context, information, administration and security tools, and so forth. The application programming interface 718 may also or instead provide a programmatic interface for hosted applications, identity provider integration tools or services, and so forth.

The endpoint 702 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 702 may include a security agent 706 that locally supports threat management on the endpoint 702, such as by monitoring for malicious activity, managing security components on the endpoint 702, maintaining policy compliance, and communicating with the threat management facility 708 to support integrated security protection as contemplated herein. The security agent 706 may, for example, coordinate instrumentation of the endpoint 702 to detect various event types involving various computing objects on the endpoint 702, and supervise logging of events in a data recorder 704. The security agent 706 may also or instead scan computing objects such as electronic communications or files, monitor behavior of computing objects such as executables, and so forth. The security agent 706 may, for example, apply signature-based or behavioral threat detection techniques, machine learning models (e.g., models developed or configured by the modeling and analysis platform 715), or any other tools or the like suitable for detecting malware or potential malware on the endpoint 702.

The data recorder 704 may log events occurring on or related to the endpoint. This may include, for example, detections by a cybersecurity system, for example, implemented in the security agent 706. This may, for example, include events associated with computing objects on the endpoint 702 such as file manipulations, software installations, and so forth. This may also or instead include activities directed from the endpoint 702, such as requests for content from Uniform Resource Locators or other network activity involving remote resources. The data recorder 704 may record data at any frequency and any level of granularity consistent with proper operation of the endpoint 702 in an intended or desired manner.

The endpoint 702 may include a filter 722 to manage a flow of information from the data recorder 704 to a remote resource such as the threat management facility 708. The information from the data recorder 704 may be stored in a data lake 730. In this manner, a detailed log of events may be maintained locally in the data recorder 704 on each endpoint, while network resources can be conserved for reporting of a filtered event stream that contains information believed to be most relevant to threat detection that is stored in the data lake 730. The filter 722 may also or instead be configured to report causal information that causally relates collections of events to one another. In general, the filter 722 may be configurable so that, for example, the threat management facility 708 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 702 may include a query interface 724 so that remote resources such as the threat management facility 708 can query the data recorder 704 remotely for additional information. This may include a request for specific events, activity for specific computing objects, or events over a specific time frame, or some combination of these. Thus, for example, the threat management facility 708 may request all detections by one or more cybersecurity systems, changes to the registry of system information for the past forty eight hours, all files opened by system processes in the past day, all network connections or network communications within the past hour, or any other parametrized request for events monitored by the data recorder 704. In another aspect, the entire data log, or the entire log over some predetermined window of time, may be requested for further analysis at a remote resource.

It will be appreciated that communications among security services 720, a threat management facility 708, and one or more endpoints such as the endpoint 702 may be facilitated by using consistent naming conventions across products and machines. For example, the system 700 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

In various implementations, the cybersecurity system evaluation and configuration may be accomplished via the user interface 712, for example, as part of the modeling and analysis component 715 of the threat management facility 708. The modeling and analysis component 715 may access data in one or more data recorders 702 of systems in a target environment (e.g., the enterprise network 703), for example, using the query system 724.

In general, the modeling and analysis component 715, or any combination of the other components of the threat management facility 708, may be configured by computer executable code to perform the malware detection and other machine learning and statistical modeling functions as described herein to obtain improved estimates of malware detection metrics. For example, the modeling and analysis component 715 may include a receiver, an estimator, and a scorer for evaluating the security status of a target environment. The receiver may be configured to receive estimates of a true positive rate and a false positive rate for a cybersecurity system under evaluation, such as by evaluating the results of a machine learning model applied to the target environment or other representative computing environments. The modeling and analysis component 715 may also or instead include an estimator configured by computer executable code to iteratively refine the estimated true positive rate and the estimated false positive rate and estimate a base event rate for the cybersecurity system under evaluation in a target environment based on the refined estimates. This may, for example, include synthesizing samples of the target environment based on a distribution of malware within a representative base data set or the like, and selecting representative samples (e.g., of computing objects or analysis objects) that produce similar malware detection metrics to the target environment. The modeling and analysis component 715 may also or instead include a determiner configured to determine an estimated distribution of false negatives based on the refined true positive rate, the refined false positive rate, and an estimated base event rate. The modeling and analysis component 715 may also or instead include a scorer configured by computer executable code to score a cybersecurity system in the target environment based on the distribution of false negatives.

In another aspect, the modeling and analysis component 715 may include an estimation engine configured by computer executable code to synthesizing a number of data sets based on properties of a base data set, to select a representative group from the number of data sets that produce a similar rate of malware to the new data set when analyzed with the malware detection system, e.g., as described herein. More generally, the modeling and analysis component 715 may use any of the techniques described herein to refine malware detection metrics for a target environment.

In some implementations, the event data needed for scoring (e.g., cybersecurity system detection events) may already be stored in the data lake 730. In some cases, the event data may be configured to be provided to the data lake 730 by the devices in the target environment (e.g., the enterprise network 703). In some cases, in advance of scoring, the threat management facility 708 may request that the data be communicated by the devices (e.g., endpoint 702) in the target environment (e.g., enterprise network 703) to the data lake 730. The events then may be accessed by the modeling and analysis platform.

Labeled data that may be used to determine initial estimates for a true positive rate and a false positive rate for a given cybersecurity system may be stored, for example, in the data lake 730. Labeled data may be available from a security service 720, for example, using the exemplary API of the security service 721. For example, a security service may offer threat management reports that provide labeled data. The labeled data may be accessed directly from the security server 720 or may be received from a security service and stored in the data lake 730 or another data store.

Figure 8:
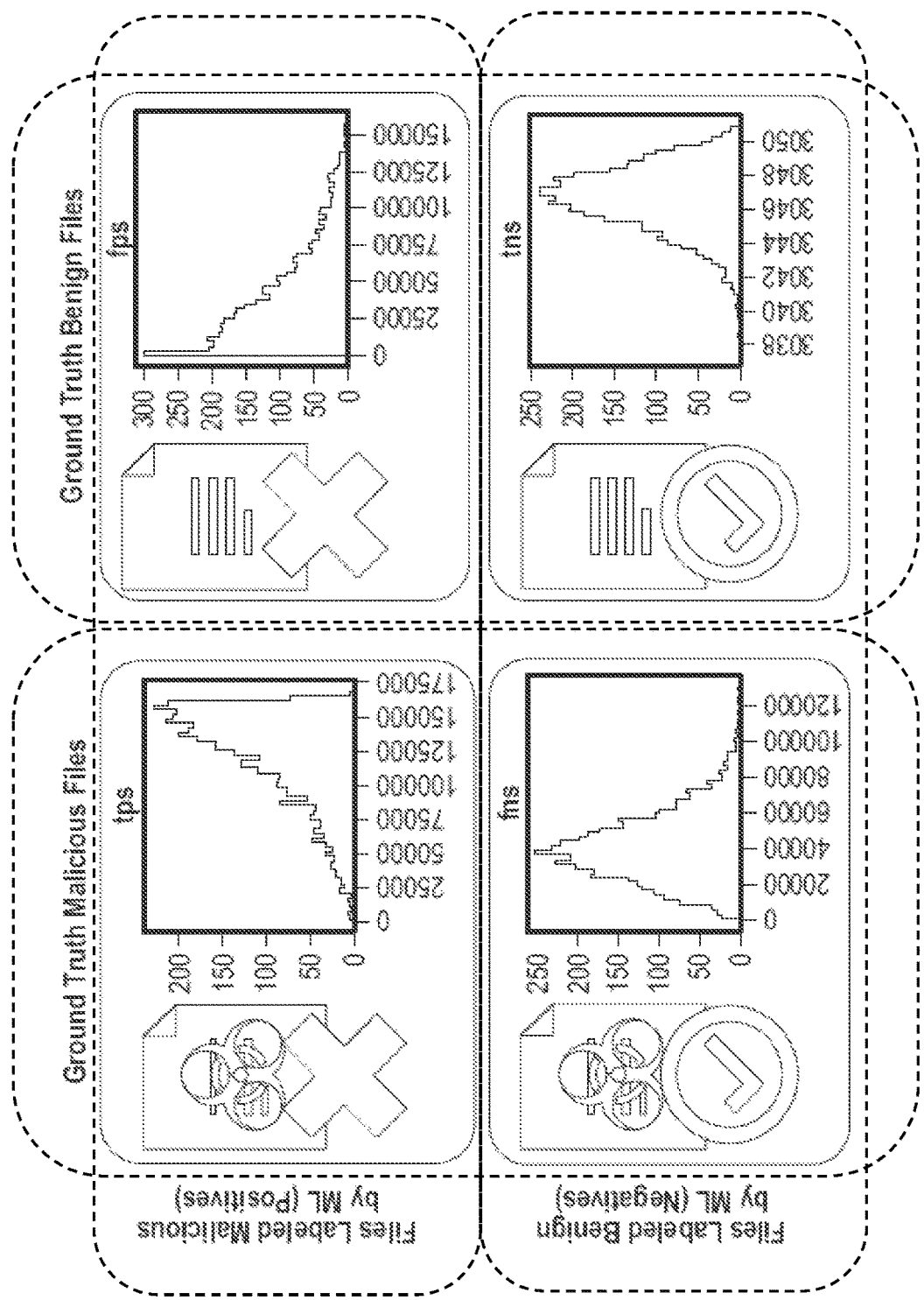
FIG. 8 illustrates a simplified example of model performance.

Referring to FIG. 8, in general, it should be understood that the disclosed systems and methods can be used to evaluate the extent to which computing devices in a target environment (e.g., an endpoint, a server, an enterprise network, a collection of networks, and the like) are infected with undetected malware, and to assess the impact of potential changes to the configuration of a cybersecurity system (e.g., changes to operational parameters, components enabled, or selection of cybersecurity systems) for the target environment. Other types of security events may be assessed using the techniques described herein to obtain useful malware detection metrics for use in configuring the cybersecurity system. For example, the malware detection system may be used to obtain improved estimates of a percentage of command line executions that go undetected, a percentage of targeted phishing email that go undetected, or any other malware detection metric where incorrect estimates, and in particular, under-reporting of malicious code or activity, may lead to unknown and/or increased risk exposures.

Some of the difficulty in assessing these risks is caused by the fact that the undetected events—the undetected malicious files, command lines, or phishing emails in these examples—are not accurately reported. The ground truth may not be known because every cybersecurity product can miss at least some malicious event and/or there will be false positives (e.g., a normal file that gets flagged as malware). Moreover, in general, the balance between benign and malicious files or events is tipped towards benign ones. That is, the target environment is typically highly skewed toward benign objects, so it may be difficult and expensive to determine ground truth with manual analysis. For example, it could require an in-depth analysis of thousands of files that a cybersecurity product labeled as benign to find a single malicious one, and this challenge becomes greater as detection improves and the rate of false negatives decreases. As described herein, Bayesian statistics may be used to build a "generative" model of the data, taking informed "guesses" about parameters such as the base event level (e.g., "how much malware is there really?") and simulating how many detections would be expected. Based on which simulations match observed reality, it is possible to work backwards to find plausible values of the parameter of interest.

To take a simplified example, in the context of malware detection, assuming that there are relatively good estimates of true and false positive rates for a given cybersecurity system (e.g., a malware detection system), and if there are 2,000 malicious events (e.g., endpoint malware detections) detected by the cybersecurity system in the customer environment in a given week, an analysis can simulate base malicious event rates (e.g., malware rates) of 0%, 2%, 5% and so on, and see what each simulation predicts for endpoint detections. If the result is around 2,000 detections for some malware rates, then that would seem to be a plausible value. This is illustrated in Table 1.

TABLE 1

| Simplified Example | | |
|---|---|---|
| Base rate of malicious events | Number of Detections | Plausible? |
| 0% | 4 | No |
| 2% | 1,980 | Yes |
| 3% | 2,070 | Yes |
| 50% | 22,100 | No |
| 99% | 34,276 | No |

Iterating this process a large number (e.g., millions) of times will build a distribution of plausible values for malware rate. Using a Bayesian approach, the error can be determined as part of the estimate. In this simplified example, the model may "think" that the most likely value for "what percentage of files are malware?" is just over 3%, but anything from about 2.75% to about 3.35% is plausible.

With a relatively good estimate of the base rate number—e.g., in this example, how many files per hundred are likely to be malware—missed detections and false positives become possible to estimate. Again, taking this simplified example of a malware detection system (e.g., a machine learning based detection system without any signature-based, behavioral, or heuristic options turned on) for the exemplary time period (e.g., a week) true and false positives and negatives can be estimated, and from that, a picture of model performance may be determined. Demonstrative results for this simplified example are shown in FIG. 8.

In this simplified example, the figure shows that while there are some false negatives, the number of false positives is relatively low and skewed towards zero (for an accurate detection system), while the number of true positives is relatively high and skewed towards 161,000 (the total number of positive results in the sample). Looking at the scale, the figure shows that all three quantities are dwarfed by the number of true negatives—benign files that this detection system labeled as benign.

The techniques described herein may be used to estimate false negatives in this context. That is, it is possible to improve the detection or estimation of malware that is missed for a given malware detection system or cybersecurity system that is under evaluation. The estimate of false negatives may be used to score a detection system under evaluation, for selection or comparison. The score can be used to configure the system, for example, by increasing the aggressiveness of detection or remediation by the system, e.g., using various techniques to increase sensitivity, select suitable models or detection techniques, adjust resources allocated to security, increase manual intervention, and so forth. Likewise, a low false negative rate might point to a configuration or allocation of resources that maintains or decreases aggressiveness in favor of less resource utilization.

Figure 9:
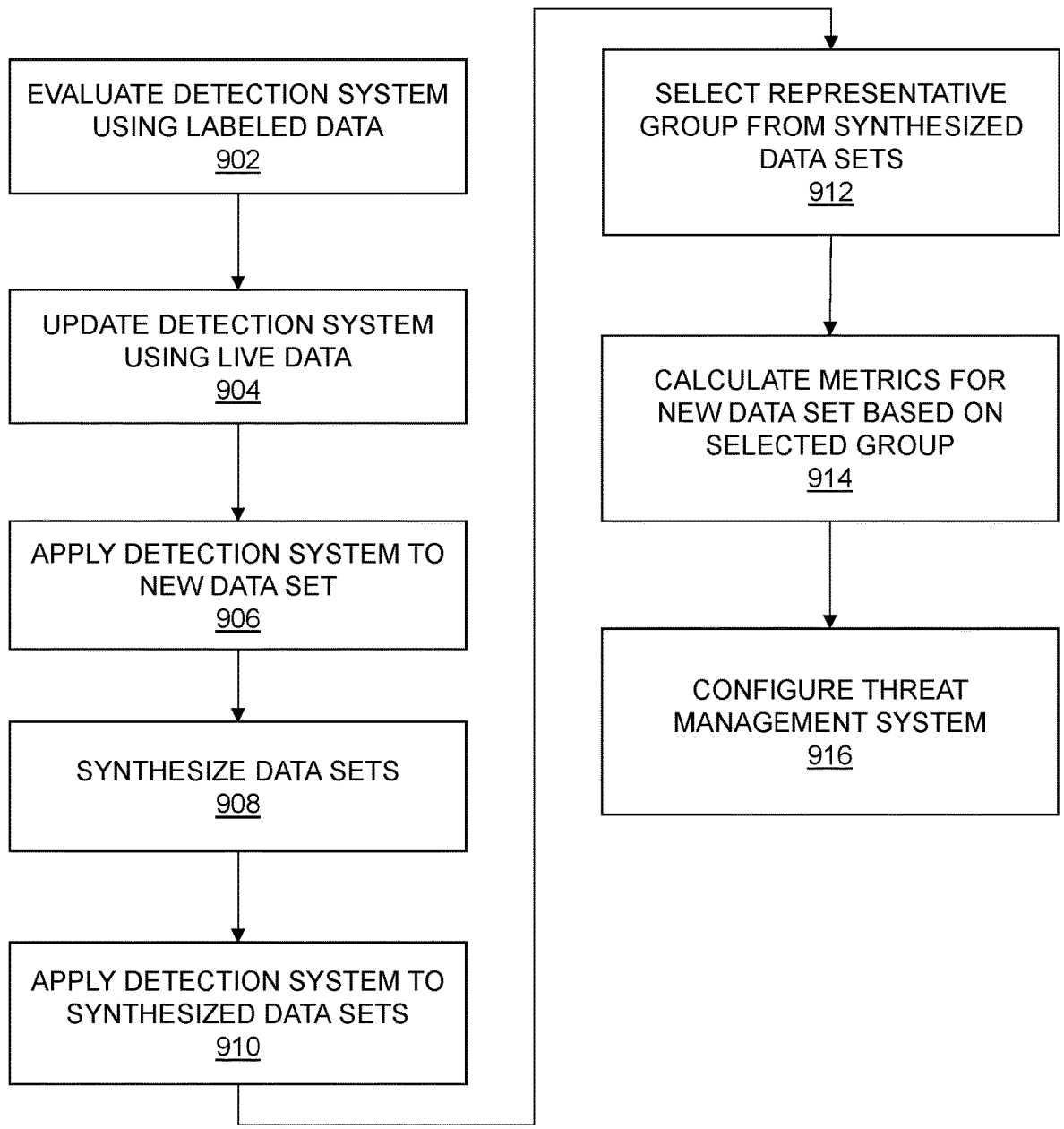
FIG. 9 illustrates a method for analyzing malware detection results.

FIG. 9 illustrates a method for analyzing malware detection results. Where the context makes it difficult to directly calculate or estimate metrics such as the number or proportion of malware detections that are true positive detections or false negatives, accurate inferences may be drawn instead by synthesizing a number of population samples, and then drawing inferences based on the calculated metrics and statistical composition of the synthesized samples.

As shown in step 902, the method 900 may include evaluating a detection system. The malware detection system may, for example, include a machine learning model trained to detect malware based on a training data set, where each software instance in the base data set is labeled to indicate a malware status. The evaluation may include evaluating a true positive rate and a false positive rate for a malware detection system, e.g., by applying the detection system to a base data set having a known composition of malicious code instances (and known benign instances) and measuring the resulting true positive rate and false positive rate. While the base data set and the training data set may include overlapping samples, it may be advantageous to provide to completely separate data sets for training and evaluation in order to avoid over-fitting the training data set or otherwise biasing model tuning and evaluation. In general, the base data set used for validation may be labeled, such as with explicit labels identifying each instance of code as malicious or benign, or otherwise labeled to permit direct measurement of the results by the malware detection system against the known composition of the base data set, as well as direct review of each individual detection (or lack thereof) for accuracy.

In general, the base data set may be automatically or manually pre-analyzed and/or have a known composition of malicious code instances. The base data set may also have a (known) base rate of malware instances indicating the true frequency of occurrence of malware within the base data set. It will be understood that in this context, a rate such as a base rate, a true positive detection rate, and a false positive detection rate may be reported as a number of instances, as a percentage, as a ratio, or using any other metric based on a comparison of the output from the malware detection system to the known composition of the source base data set. Where the rate is reported as a raw number of instances, it may be appropriate in some instances to scale sample sizes, synthesized data sets, or the like so that synthesized results can be compared more directly to actual results.

As shown in step 904, the method 900 may include updating the detection system using live data. For example, this may include revising a prior probability distribution function or other distribution derived from the base data set as automated or manual malware distribution data becomes available from the detection system on live data. In one aspect, this may include updating the true positive rate and the false positive rate based on additional software instances received by the malware detection system and automatically labeled by the malware detection system as safe or malicious.

As shown in step 906, the method 900 may include applying the malware detection system to a new data set, such as live data obtained from an enterprise network and/or analyzed for the enterprise with the malware detection system. In this context, candidate malware samples may be any software, files, or the like including, e.g., web content, executable or application downloads, electronic mail communications, electronic mail attachments, endpoint file scans, and so forth. In general, the malware detection system will provide a malware detection rate for the new data set, which may be reported as a raw number of detections (along with a raw number of samples analyzed), a ratio, or any other number, which may be reported as the total rate or number of detections for the new data set.

As shown in step 908, the method 900 may include generating a number of synthetic data sets based on one or more properties of the base data set, such as a distribution of malware instances within the base data set. As noted above, it may be difficult to accurately calculate or estimate the number of true positives versus false positives in a total number of reported malware instances. To address this difficulty, a number of data sets may be synthesized that represent possible samples of data from a general population such as the base data set (or the base data set as refined using live data, where available in a useful form). Each of these data sets may then be evaluated with the malware detection system, and when one of the synthesized data sets yields an identical or similar detection rate to the detection rate for the new data set, the composition of that synthesized data set can be added to a group of data sets that might have a similar composition to the new data set. In this manner, a probability distribution for a composition of the new data set (measured, e.g., as the base rate, the true positive rate, the false positive rate, or any other useful metrics) can be created based on other synthesized data sets that yield similar output from the malware detection system.

As shown in step 910, the method 900 may include applying the malware detection system to the synthesized data sets.

As shown in step 912, the method 900 may include selecting a representative group from the number of synthesized data sets. For example, this may include selecting a representative group from the number of synthetic data sets that produce a corresponding set of numbers of detection similar to the first number of detections within the new data set, or more generally, a representative group yielding similar malware detection results to the new data set. In this context, the similarity in number of detections may be measured in a number of ways. For example, the corresponding set of numbers of detection may be any number of detections within a predetermined threshold of the first number of detections. In one aspect, this may be measured as a raw number of detections, and the predetermined threshold may be an absolute numerical threshold. The number of detections may also or instead include a relative threshold that is scaled according to ratio of the size of the new data set to the size of the synthetic data sets. Thus, for example, where the new data set includes ten thousand samples, but each synthetic data set if two thousand samples, the threshold may be scaled (e.g., by multiplying numbers of detection in the synthetic data sets by five) to facilitate more direct comparison between the observed data set (the new data set) and the synthetic data sets used as representative samples from the overall population. A rate of detection may also or instead be used, along with a predetermined threshold for the rate, in order to facilitate comparison among data sets having different numbers of samples. Thus, in one aspect, the selection may include selecting a representative group from the number of synthetic data sets that produce a corresponding detection rate similar to the first detection rate within the new data set.

As shown in step 914, the method 900 may include determining a malware detection metric for the new data set based on the representative group of synthesized data sets.

For example, this may include determining a malware detection metric such as the base rate of malware in the new data set, the true positive rate for detections, the false positive rate for detections, or the number or rate of missed detections, based on a statistical composition of the representative group. More generally, this may include determining one or more malware detection metrics for the new data set based on a statistical composition of the representative group. For example, the malware detection metric may include an estimated base rate of malware instances for the new data set, which may be determined based on the number or rate of malware instances in each of the synthetic data sets in the representative group. The one or more malware detection metrics may also or instead include an estimated true positive rate, an estimated false positive rate, an estimated number of missed detections, a ratio of true positives to false positives, or any other metric or combination of metrics for the new data set that might be obtained by analyzing the composition of the representative group of synthesized data sets.

It will be understood that there may be any number of synthesized data sets. Thus, the results for a malware detection metric may be reported using any suitable descriptive statistic or the like. For example, the malware detection metric may include a probability distribution such as a probability distribution for an estimated base rate of malware instances for the new data set. As another example, the malware detection metric may include a confidence interval for the estimated base rate of malware instances. Other descriptive statistics may also or instead be used such as a mean, a variance, and so forth. In another aspect, other malware detection metrics may also or instead be reported.

As shown in step 916, the method 900 may include configuring the threat management system. The threat management system may include any number of tuning and configuration parameters that might usefully be adjusted in response to a malware detection metric. For example, this may include controlling how frequently or aggressively local security agents on endpoints scan for malware, how aggressively network traffic is monitored (including content of network traffic and addresses of network traffic), permitted use of resources having unknown reputation, and so forth. This may also include the frequency and granularity with which events are monitored by local security agents and/or reported to the threat management facility. Thus, the method 900 may include adjusting a security parameter used by a threat management facility to manage security of an enterprise network, or adjusting or controlling any other security management or response activities, based on a malware detection metric that has been calculated or refined to be more accurate using the techniques described herein More generally, a variety of advantages may accrue to a system or method that can obtain more accurate characterizations of detection rates using the techniques described herein. For example, in an actuarial context, an insurance company or other auditor or analyst may benefit from more accurate information about actual threat exposure (the true malware rate within a target environment), or more accurate information about the degree to which alerts and alert volume from a cybersecurity system is related to true and false positive detection rates. In another aspect, the techniques described herein support a more accurate view of action malware presence through a sensing system that is known to be relatively noisy in many cases (i.e., prone to inaccurate outcomes). This may be used, e.g., to control the level of human monitoring deployed in a managed security system, or to control the price for externally managed security services sold to an enterprise. For example, subscription-based cybersecurity services may be variably priced based on the true rate of malware occurrence within the enterprise.

According to the foregoing, there is also described herein a system including a memory storing a detection model having a true detection rate and a false detection rate for identifying malware when applied to a base data set having a known malware composition; a malware detection system configured to apply the detection model to a new data set to determine a rate of malware occurring within the new data set; an estimation engine configured to synthesizing a number of data sets based on properties of the base data set, to select a representative group from the number of data sets that produce a similar rate of malware to the new data set when analyzed with the malware detection system; and a scoring engine to calculate one or more malware metrics for the new data set based on the representative group. The detection model may, for example, include a machine learning model trained to detect malware using malware labels for a training data set, or any other suitable detection model. The system may also include a threat management facility configured to adjust a tuning parameter to control a sensitivity for detection of or response to threats based on the one or more malware metrics.

A variety of techniques are known for synthesizing data sets that are statistically representative of a base data set. For example, the estimation engine (or other system component) may synthesize a number of data sets using a Metropolis-Hastings algorithm to randomly draw candidates from a proposal distribution and conditionally include each randomly drawn candidate in the synthesized data set using a probability function. As a significant advantage, this approach can produce new data sets with a process that more closely approximates the distribution of the base data set as more new samples are iteratively added. It will be understood that in this context, the base data set may be the base data set used to train or validate the malware detection system, or a different data set, or some combination of these, such as a distribution that uses the original, base data set as a Bayesian strong prior distribution that is refined with current observations. The estimation engine may also or instead synthesize the number of data sets using a Sequential Monte Carlo simulation to randomly draw samples from the base data set or some other proposal distribution, and beta-weighting a result with an increasing beta until an explained sum of squares is within a predetermined threshold of a target. It will be understood that these modeling techniques may involve some exercise of discretion, e.g., to ensure a suitable sample window, and values of parameters such as the beta used for weighting results of random selections. Other generative modeling techniques for synthesizing suitable probability distributions are also known in the art, and may also or instead be used to synthesize data sets for use in additional modeling and analysis as described herein.

As described above, once a numerical measure (such as number or rate of malware detections) is obtained for a new data set with the malware detection system, a representative group of these synthesized data sets may be selected that also produce a similar or identical numerical measure when analyzed by the malware detection system. This representative group may be used, in turn, to estimate malware detection metrics for the new data set, e.g., by analyzing the collective composition of these synthesized data sets that produced similar numerical outputs from the malware detection system.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:

evaluating a true positive rate and a false positive rate for a malware detection system, the true positive rate corresponding to an accurate detection of malware by the malware detection system in a base data set and the false positive rate corresponding to an erroneous detection of malware in the base data set by the malware detection system, the base data set labeled with a known composition of malicious code instances and the base data set having a base rate of malware instances;

applying the malware detection system to a new data set to determine a first number of detections within the new data set;

generating a number of synthetic data sets with an estimation engine based on a distribution of malware instances within the base data set;

selecting a representative group from the number of synthetic data sets that produce a corresponding set of numbers of detection when analyzed with the malware detection system similar to the first number of detections produced within the new data set when analyzed with the malware detection system, wherein the corresponding set of numbers of detection are each within a predetermined threshold of the first number of detections, and wherein the predetermined threshold is a relative threshold scaled according to a ratio of a size of the new data set to the size of each of the synthetic data sets; and determining a malware detection metric for the new data set based on a statistical composition of the representative group.

2. The computer program product of claim 1, wherein the predetermined threshold is an absolute numerical threshold.

3. The computer program product of claim 1, wherein the new data set includes live samples analyzed for an enterprise by the malware detection system.

4. The computer program product of claim 1, wherein evaluating the true positive rate and the false positive rate for the malware detection system includes measuring the true positive rate and the false positive rate for the malware detection system when applied to a base data set having a known composition of malware instances and benign instances.

5. The computer program product of claim 1, wherein the malware detection system is a machine learning model trained to detect malware based on a training data set, further wherein each software instance in the training data set is labeled to indicate a malware status.

6. The computer program product of claim 1, further comprising computer executable code that, when executed, performs the step of updating the true positive rate and the false positive rate based on additional software instances received by the malware detection system and automatically labeled by the malware detection system as safe or malicious.

7. A method comprising:
evaluating a true detection rate and a false detection rate for a malware detection system when applied to a base data set having a known composition of malicious code instances;
applying the malware detection system to a new data set to determine a first detection rate for the new data set;
generating a number of synthetic data sets based on one or more properties of the base data set;
selecting a representative group from the number of synthetic data sets that produce a corresponding detection rate when analyzed with the malware detection system similar to the first detection rate within the new data set when analyzed with the malware detection system; and
determining a malware detection metric for the new data set based on a statistical composition of the representative group selected from the number of synthetic data sets, wherein the malware detection metric includes at least one of a probability distribution for an estimated base rate of malware instances for the new data set and a confidence interval for the estimated base rate of malware instances.

8. The method of claim 7, further comprising adjusting a security parameter used by a threat management facility to manage security of an enterprise network based on the malware detection metric.

9. The method of claim 7, wherein the malware detection metric includes an estimated base rate of malware instances for the new data set.

10. The method of claim 7, wherein the malware detection metric includes at least one of an estimated true positive rate for the new data set and an estimated false positive for the new data set.

11. The method of claim 7, wherein the malware detection metric includes an estimated number of missed detections for the new data set.

12. The method of claim 7, wherein the malware detection metric includes a ratio of true positives to false positives for the new data set.

13. The method of claim 7, wherein the malware detection system includes a machine learning model trained to detect malware based on a training data set.

14. The method of claim 13, wherein each software instance in the training data set is labeled to indicate a malware status.

15. A system comprising:
a memory storing a detection model having a true detection rate and a false detection rate for identifying malware when applied to a base data set having a known malware composition;
a malware detection system configured to apply the detection model to a new data set to determine a rate of malware first number of detections occurring within the new data set;
an estimation engine configured to synthesize a number of synthetic data sets based on properties of the base data set, and to select a representative group from the number of synthetic data sets that produces a similar rate of malware when analyzed with the malware detection system to the new data set when analyzed with the malware detection system, wherein the estimation engine synthesizes the number of synthetic data sets using a Sequential Monte Carlo simulation to randomly draw samples from the base data set and beta-weighting a result with an increasing beta until an explained sum of squares is within a predetermined threshold of a target; and
a scoring engine to calculate one or more malware metrics for the new data set based on the representative group.

16. The system of claim 15, wherein the estimation engine synthesizes the number of synthetic data sets using a Metropolis-Hastings algorithm to randomly draw candidates from a proposal distribution and conditionally include each randomly drawn candidate using a probability function.

17. The system of claim 15, wherein the detection model includes a machine learning model trained to detect malware using malware labels for a training data set.

18. The system of claim 15, further comprising a threat management facility configured to adjust a tuning parameter to control a sensitivity for detection of or response to threats based on the one or more malware metrics.

19. The system of claim 15, wherein the one or more malware metrics for the new data set includes an estimated true positive rate for the new data set.

20. The system of claim 15, wherein the one or more malware metrics for the new data set includes an estimated false positive rate for the new data set.

* * * * *